US009350703B2

(12) United States Patent
Murthy et al.

(10) Patent No.: US 9,350,703 B2
(45) Date of Patent: May 24, 2016

(54) ENFORCEMENT OF NETWORK-WIDE CONTEXT AWARE POLICIES

(71) Applicant: Futurewei Technologies, Inc., Plano, TX (US)

(72) Inventors: Shree Murthy, San Jose, CA (US); Jun Xu, Cupertino, CA (US)

(73) Assignee: Futurwei Technologies, Inc., Plano, TX (US)

( * ) Notice: Subject to any disclaimer, the term of this patent is extended or adjusted under 35 U.S.C. 154(b) by 0 days.

(21) Appl. No.: 14/270,501

(22) Filed: May 6, 2014

(65) Prior Publication Data

US 2015/0326528 A1    Nov. 12, 2015

(51) Int. Cl.
*G06F 17/00* (2006.01)
*H04L 29/06* (2006.01)

(52) U.S. Cl.
CPC ............... *H04L 63/02* (2013.01); *H04L 63/20* (2013.01)

(58) Field of Classification Search
CPC .............................. H04L 63/02; H04L 63/20
USPC ............................................................ 726/1
See application file for complete search history.

(56) References Cited

U.S. PATENT DOCUMENTS

| 7,072,956 | B2 | 7/2006 | Parupudi et al. |
| 8,689,281 | B2 | 4/2014 | Balinsky et al. |
| 2003/0226037 | A1* | 12/2003 | Mak ............................. 713/201 |
| 2005/0060568 | A1* | 3/2005 | Beresnevichiene et al. .. 713/200 |
| 2007/0050850 | A1* | 3/2007 | Katoh et al. ..................... 726/27 |
| 2008/0107119 | A1* | 5/2008 | Chen .................. H04L 12/5695 370/395.21 |
| 2008/0194233 | A1 | 8/2008 | Henry |
| 2011/0296430 | A1 | 12/2011 | Jandhyala et al. |
| 2014/0259092 | A1* | 9/2014 | Boucher et al. ................... 726/1 |

OTHER PUBLICATIONS

Volker Sander; End-to-End Provision of Policy Information for Network QoS; IEEE; Year: 2001; p. 1-12.*

* cited by examiner

*Primary Examiner* — Monjour Rahim
(74) *Attorney, Agent, or Firm* — Conley Rose, P.C.; Grant Rodolph; Brandt D. Howell

(57) ABSTRACT

A method implemented in an edge router, the method comprising receiving an authentication request from a device, forwarding the authentication request to an authentication and policy server, receiving an authentication response and an indication of a device tag from the authentication and policy server, wherein the device tag is based on a characteristic of the device, a location, a destination, or a user of the device, forwarding the authentication response to the device, receiving a policy associated with the device tag from the authentication and policy server, receiving a packet from the device, embedding the device tag in the packet to form a tagged packet, and executing the policy.

16 Claims, 4 Drawing Sheets

ENFORCEMENT OF NETWORK-WIDE CONTEXT AWARE POLICIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A policy may be a set of rules that are enforced on a device desiring to access a network and/or network resources. The policy may be applied due to characteristics of the device itself or a user of the device. A policy may also be enforced on an application. Policies may govern access to a network and may play a role in network security and defense. For example, at a policy enforcement point, a decision may be made regarding which parts of a network, if any, that a device or an application may be allowed to access. The device or application may then be allowed to access the network according to the decision made.

As packets in a traffic flow enter a network, each packet may be examined at an entry point or node in a network to determine a classification. A policy may be applied based on the classification. As a packet traverses the network, the packet may be reclassified at each point or node in the network for the purpose of applying a policy to the packet. This classification and reclassification process is costly in terms of resources expended. An additional issue with classification of packets is that user context information may not be available in each packet, thus limiting the types of policies that may be applied. Thus, there is a need to improve upon conventional policy enforcement in communication networks.

SUMMARY

In at least one embodiment, the disclosure includes a method implemented in an edge router, the method comprising receiving an authentication request from a device, forwarding the authentication request to an authentication and policy server, receiving an authentication response and an indication of a device tag from the authentication and policy server, wherein the device tag is based on a characteristic of the device, a location, a destination, or a user of the device, forwarding the authentication response to the device, receiving a policy associated with the device tag from the authentication and policy server, receiving a packet from the device, embedding the device tag in the packet to form a tagged packet, and executing the policy.

In another embodiment, the disclosure includes a method implemented in an authentication and policy server configured to couple to a plurality of edge routers, the method comprising receiving a request for authentication from a device via an edge router in the plurality of edge routers, performing authentication of the request, wherein authentication comprises determining an identity of a user associated with the device, sending a message to the edge router, wherein the message indicates a tag to be applied to packets from the device, wherein the tag is based on at least one of a characteristic of the device, a location, a destination, the user associated with the device, or an application, determining a policy to be applied to packets comprising the tag, and in response to the determining, communicating the policy to each of the plurality of edge routers.

In yet another embodiment, the disclosure includes an apparatus comprising a memory, at least one transceiver configured to receive an authentication request from a device, forward the authentication request to an authentication and policy server, receive an authentication response and an indication of a device tag from the authentication and policy server, wherein the device tag is based on a characteristic of the device, a location, a destination, or a user of the device, forward the authentication response to the device, receive a packet from the device, receive a policy associated with the device tag from the authentication and policy server, and a processor coupled to the memory, wherein the memory contains instructions that when executed by the processor cause the apparatus to embed the device tag in the packet to form a tagged packet, and execute the policy, wherein the at least one transceiver is further configured to forward the tagged packet according to the policy.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are apparatuses, systems, and methods that provide for and enforce network-wide context aware policies. Embodiments presented herein classify incoming packets and embed one or more tags within the packets according to the classification. Tags may be embedded in packets at an entry point in a network, e.g., an edge router. The tags may comprise context information which may be carried along with packets and used to enforce policies throughout network infrastructure. The type of access a device may be given to a network may be based on the context of a connection, such as the device used on the connection, the application used, the user of the device, and/or the type and location of the device. The utilization of tags may reduce operating expenses, wherein traffic may not have to be reclassified at every potential policy application point in a network. Policies may be provided by a single point of management such as a policy server. Once embedded in a packet, a tag may be carried across different nodes on a path with a policy applied at each node along the path. The term "traffic" as used herein may refer to a series of packets that comprise a packet flow or data stream. A first type of tag, referred to as a "device tag", may be assigned to and embedded in packets based on a characteristic of a device used to generate the packets or a user associated with the device and possibly also based on the destination of the packets. A second type of tag, referred to as an "application tag", may be assigned to and embedded in packets generated by an application within the device. Once embedded in a packet, these tags provide a mechanism for routers along a path to quickly inspect the tags, lookup a policy associated with the tags, and apply the policy. Within a network, there may be a single node that provides policy and tag information to routers and switches within a network. Thus, the proposed architecture provides a single point of control with the advantage that operational expenses may be reduced.

Figure 1:
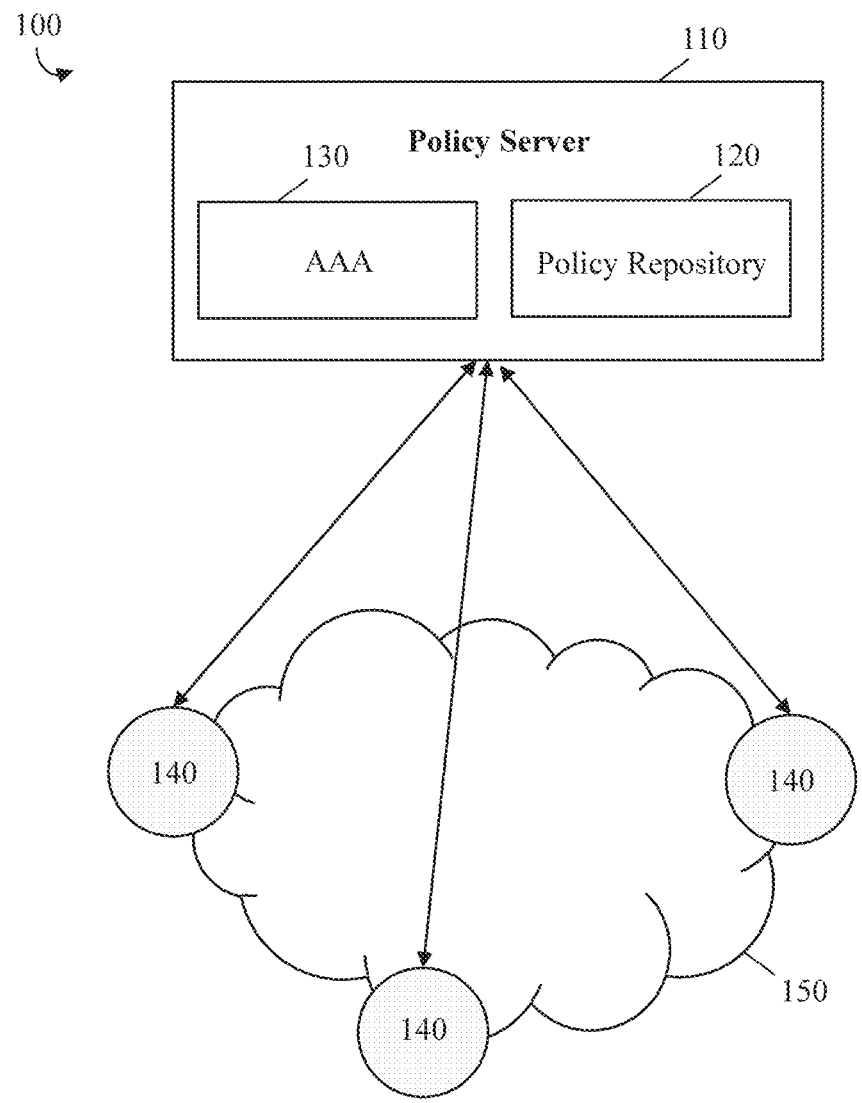
FIG. 1 is an embodiment of a network architecture that performs policy enforcement.

FIG. 1 is an embodiment of a network 100 that performs policy enforcement. The network 100 comprises a policy server 110 and a plurality of edge routers 140. The edge routers 140 are interconnected by a network 150, such as an Internet Protocol (IP) network. In other words, there may be one or more intermediate nodes or routes interconnecting edge routers 140. The policy server 110 further comprises a policy repository 120 and an authentication, authorization, and accounting (AAA) entity 130. Due to the AAA entity 130 within the policy server 110, the policy server 110 may be referred to sometimes herein as an authentication and policy server. The policy server 110 may assign tags associated with different devices, users, locations, and applications and map the tags to corresponding policies. Communication devices (or simply "devices", not shown) may access the network 150 via edge routers 140. The network 150 may provide Internet connectivity to such devices. The plurality of edge routers 140 may provide access to the network 150. Information may be passed from node to node through the network 150 using layer 2 (L2) or layer 3 (L3) protocols. Three edge routers 140 are shown for illustrative purposes, but any number of edge routers 140 may be used in the architecture.

When a device (or a user of the device) desires to begin a communication session, the device may send an authentication request to its closest edge router 140, which may then forward the request to the policy server 110. The authentication request may carry context information related to the device, location, or a user of the device. The authentication request may trigger the policy server 110 to lookup a device tag based on the context information and assign a device tag to the edge router 140 that forwarded the request. The edge router 140 may embed the device tag in traffic coming from the device. For a traffic flow exiting the network 150 via an edge router 140 and in which packets in the packet flow comprise tags, the edge router 140 may not only apply a policy to the traffic flow, the edge router 140 may remove the tags for the traffic exiting the network 150.

Device tags may be assigned based on context information related to a device or a user of the device. Context information may include some combination of an access method of a device (e.g., wired or wireless connection), device type (e.g., smartphone, tablet computer, laptop computer, etc.), Internet Protocol (IP) or Media Access Control (MAC) address of the device, port information (e.g., the port through which traffic from the device enters an edge node), time of day, location of the device, the identity of the user of the device, destination of packets, and/or ownership of the device (e.g., whether the device is a personal device or is a company-owned device). In an embodiment, a user may be associated with a device and may be identified by an authentication procedure such as an entry of a password. The user may be provided with different levels of access, depending on the identity or location of the device, which may be determined in an authorization process. The levels of access may be dictated by a policy. A policy associated with a tag is a set of rules to be applied to traffic carrying the tag. Policies may be applied at different points in a network, such as in the edge routers 140. Different policies may be applied for a given tag at different points (e.g., nodes) in the network.

By way of a more concrete example, if a user belongs to a particular user group, a device tag corresponding to the user group may be assigned to a device being used by the user. For example, there may be different user groups within an enterprise, such as a finance group and a marketing group. A user in a specific group may only have access to resources assigned to that group. In order to distinguish traffic from a user in one group from traffic from a user in a second group, device tags may be applied.

Device tags for different devices may be assigned by a policy server that performs tag to policy mappings, wherein a tag may be carried within a data packet as it traverses a network. A policy server may also be referred to herein or in the art as a policy controller, a central policy engine, or an authorization and policy server.

A device tag may be used during packet forwarding instead of looking up an IP and/or MAC address, which would utilize a greater number of lookup bits (potentially a much greater number) in comparison to the number of bits used for a tag and therefore provide for much faster and simpler lookup. These tags may ensure simplicity in policy enforcement without needing to update information due to mobility. IP mobility may enable a device to shift from one network to another with changing IP addresses. The usage of tags may essentially be independent of addresses, such as IP version 4 (IPv4) or IP version 6 (IPv6) addresses, wherein IPv4 and IPv6 use 32-bit and 128-bit addresses, respectively.

The authentication request may also carry context information regarding an application used by a device. The policy server 110 may assign an application tag based on the application being used. Application tags may be assigned to applications following deep packet inspection (DPI), wherein network packets may be filtered or examined at specific inspection points for policy compliance. An example of an application may be any web-based software application such as SKYPE, DROPBOX, and AMAZON. Tags for different applications may be inserted in a packet at an edge router or at a specialized service element, which performs DPI. An edge router may be any device that offers an entry point into a network, such as an access switch or router. In an embodiment, an application tag may be applied when a packet is at the first hop in a network, wherein DPI may be offered as a service. The tag may be inserted into a packet based on the application-level information extracted after conducting DPI. Application tags may be optional and may be carried in a data packet along with a device tag. After a packet has been examined via DPI and tagged after identifying an application, policies may be based on requirements for a particular application. For example, in a voice application, minimal latency may be required, while minimal jitter may be required in a video application. In a data application, bandwidth throttling may be required to reduce usage and congestion. Additionally, policies may be set according to the classification from a device tag. For example, devices in different applications or classes may be limited to use only a specific amount of data (e.g., voice or video). Based on the classification of devices, specific requirements of different applications, or any combination thereof, various policies may be customized for enforcement in a network.

Application tags may be advantageous since they may allow traffic in a network to undergo a single classification in order to apply the appropriate policies without having to reclassify traffic at a plurality of points. Throughout a network infrastructure, application tags may be reused to carry context information, resulting in a reduction in resources. Application tags may not necessarily be required in a network, but they may be offered as a service to devices. Thus, an entire network upgrade is not required since only policy application points or entry points in an infrastructure may need to be aware of tag information. This may be implemented by adding a tag-aware functionality in an overlay to the edges or service hops. The application tags may be transparent to intermediate network hops and may work with both layer 2 and layer 3 (L2 and L3) infrastructure.

After a packet has been examined via DPI and tagged after identifying an application, policies may be based on requirements for a particular application. For example, in a voice application, minimal latency may be required, while minimal jitter may be required in a video application. In a data application, bandwidth throttling may be required to reduce usage and congestion. Additionally, policies may be set according to the classification from a device tag. For example, devices in different applications or classes may be limited to use only a specific amount of data (e.g., voice or video). Based on the classification of devices, specific requirements of different applications, or any combination thereof, various policies may be customized for enforcement in a network.

A device tag may be used during authentication instead of looking up an IP/MAC address which would utilize a greater number of lookup bits in comparison to bits for a tag. These tags may ensure simplicity in policy enforcement without needing to update information due to mobility. IP mobility may enable a device to shift from one network to another with changing IP addresses. The usage of tags may essentially be independent of addresses, such as IP version 4 (IPv4) or IP version 6 (IPv6) addresses, wherein IPv4 and IPv6 use 32-bit and 128-bit addresses, respectively.

The AAA entity 130 and the policy repository 120 may together conduct device authentication, classification, and tag-to-policy mapping. A policy repository 120 may be a storage location in memory wherein different versions of policies are archived for policy management. The AAA entity 130 may be utilized for device authentication in order to associate a tag with a device. In an embodiment, the AAA entity 130 may be a Lightweight Directory Access Protocol (LDAP) server, wherein LDAP may be incorporated with existing AAA protocols for authentication and authorization support.

The policy server 110 may send an indication of a device and/or application tag to a plurality of edge routers 140 via out-of-band communication as illustrated by the arrows in FIG. 1. Out-of-band communications may employ a different protocol than that used between edge routers 140, such as Transmission Control Protocol (TCP). The policy server 110 manages the label space for device tags and application tags. In other words, there may be some number of device tags and application tags, and the policy server manages the mapping or association of available device tags and application tags to devices and applications, respectively. The policy server 110 also manages the mapping of device tags and application tags to policies.

Figure 2:
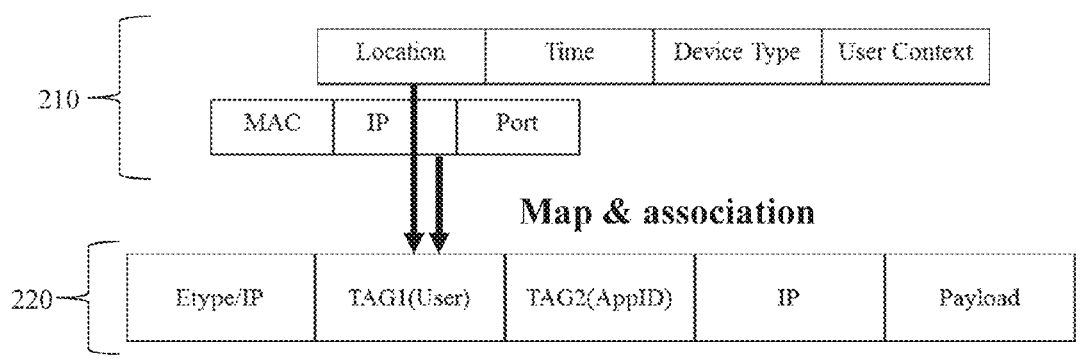
FIG. 2 is an embodiment of a data packet illustrating tag to policy mapping.

FIG. 2 illustrates tag lookup and embedding of tags in a data packet. The fields 210 represent data fields that may be available to a policy server. One or more of the fields 210 may be available in an Ethernet frame comprising fields such as EtherType (Etype) and MAC/IP addresses in the header. An Ethernet frame may also comprise a payload and redundancy check. The fields 220 represent potential fields in a tagged packet. Two tags are shown as having been embedded into the packet—TAG1 and TAG2. TAG1 may be a device tag and TAG2 may be an application tag. TAG1 may be based on user context, such as location, time, device type, user context, MAC/IP addresses, and port information, and TAG2 may be based on application-level information which may obtained from DPI. Both the user and application tags (TAG1 and TAG2) may be inserted into fields anywhere within the header of a data packet.

The number of bits in a tag, such as TAG1 and TAG2 in FIG. 2, may be constant despite changes in IP addresses as a device traverses a single system or multiple systems. For example, a router may permit multiple services on the router itself. If a packet comes in at the router in a conventional approach, the packet may have to be reclassified at each of the multiple services on the router, wherein the appropriate policies would then be applied. However, by applying a constant tag to the packet, the packet may carry user context information as it traverses the multiple services. Thus, information from the device and application tags may be carried within a single system or multiple systems, and policies may be applied without requiring reclassification.

Figure 3:
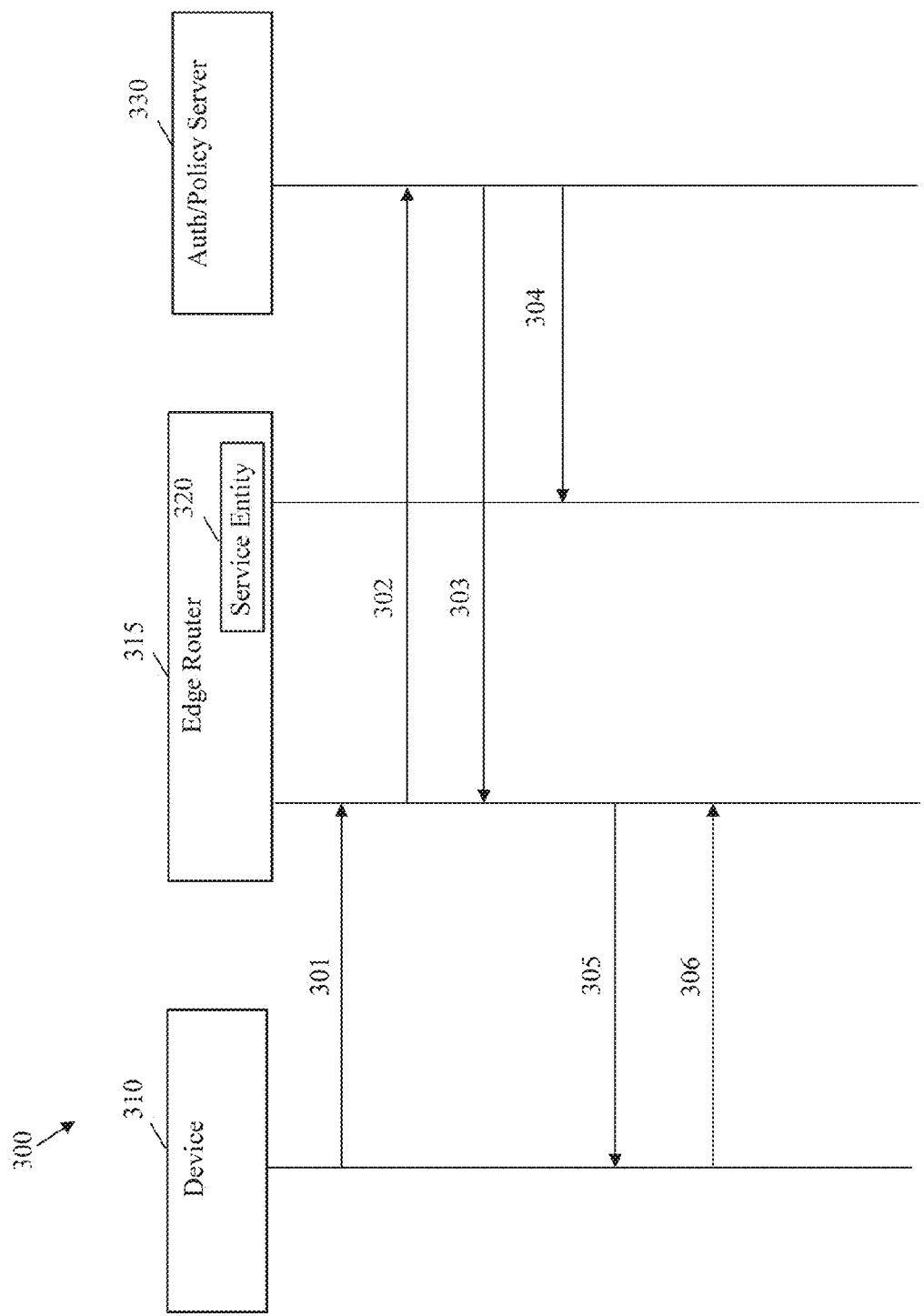
FIG. 3 is a protocol diagram illustrating an embodiment of signaling between an edge router and an authorization and policy server.

FIG. 3 is a protocol diagram 300 illustrating an embodiment of signaling between a device 310, an edge router 315, and an authentication and policy server (or policy server for short) 330. The device 310 may be any type of communication device, such as a smartphone, tablet computer, or laptop computer. The device 310 may be employed by a user (e.g., a person). The edge router 315 may comprise a service entity 320, which may be a control plane of the router in which policies may be applied. The service entity 320 may be a firewall, a media translator, a load balancer or any network service as examples. The protocol diagram 300 illustrates signaling between the entities shown when a device 310 initiates communication with an edge router 315 in a network. The policy server 330 may be the same as the policy server 110, and the edge router 315 may be the same as edge routers 140.

The edge router 315 may receive an initial authentication request from the device 310 at step 301. Next, the edge router 315 may forward the authentication request in step 302 to the policy server 330. The authentication request may include or indicate characteristics of the device 310 or a user of the device 310 or an application running on the device 310. The policy server 330 uses the characteristics to determine or lookup device and/or application tags and associated policies to be applied to packets having these tags. The policy server 330 may also authenticate the device 310 or the user associated with the device 310. In step 303, the authentication and policy server 330 may send the authentication and an indication of the determined device or application tag to the edge router 315. In step 304, the policy server 330 may send the determined policies and application tags to a service entity 320. The device 310 may be unaware of the tagging procedures occurring between the edge router 315 and the policy server 330. In step 304, the policy server 330 may also send the determined policies and tags to other edge routers in a same domain or area as the edge router 315. In step 305, the edge router 320 may forward or send an authentication response to the device 310. In step 306, the device 310 may begin sending data packets in a traffic stream to the edge router 315. The edge router 315 may inspect the fields of the data packets and possibly other information from the device 310, select the tag or tags most appropriate for the data packets, and embed the tag(s) into the data packets. The edge router 315 may also apply a policy to the data packets according to the policy or policies received from the policy server 330 and forward the packets according to the policy. The assigned policy corresponding to the tagged packet may subsequently be enforced at all the other service points throughout a network infrastructure.

Figure 4:
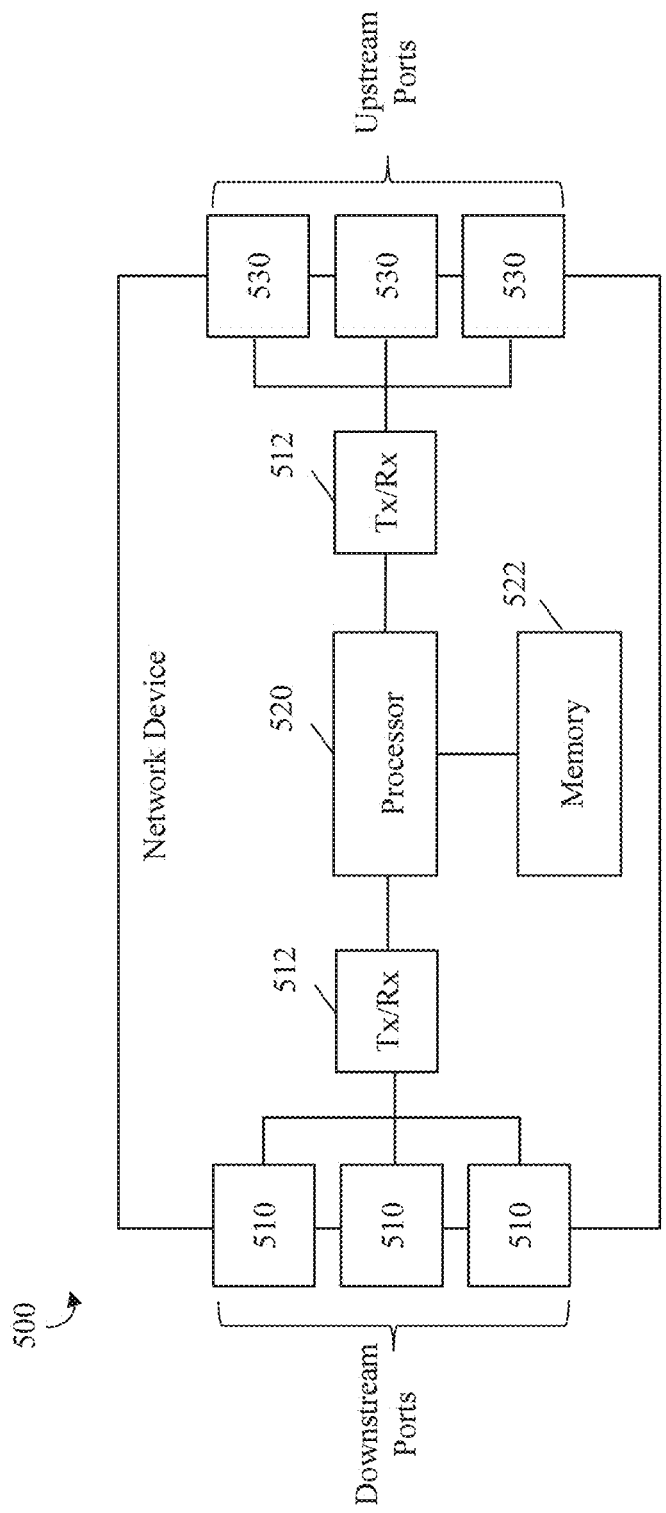
FIG. 4 illustrates an embodiment of a network device or apparatus.

FIG. 4 illustrates an embodiment of a network device 500. The network device 500 may comprise downstream ports 510, transmitter/receivers (or transceivers) 512, a processor 520, a memory 522, and upstream ports 530 coupled as shown in FIG. 4. The network device 500 may be configured as an edge router, such as edge routers 140, or as a policy server, such as policy server 110.

A first transceiver 512 may be coupled to a plurality of downstream ports 510 for transmitting and/or receiving frames or packets from other nodes, and a second transceiver 512 may be coupled to a plurality of upstream ports 530 for transmitting and/or receiving frames or packets from other nodes. The downstream ports 510 and/or upstream ports 530 may contain electrical and/or optical transmitting and/or receiving components. The terms "downstream" and "upstream" may be somewhat arbitrary in some instances, but if the network device 500 is acting as an edge router, the downstream ports may face or couple to nodes exterior to a network for which the network device 500 is acting as an edge router and the upstream ports may face or couple to nodes interior to the network for which the network device 500 is acting as an edge router. If the network device 500 is acting as a policy server, the distinction between "upstream" and "downstream" may not apply and all ports 510 and 530 may be equivalent in terms of coupling the network device 500 (acting as a policy server) to edge routers.

The processor 520 may be coupled to a transceiver 512 to process frames or packets and/or determine the nodes to which to send frames or packets. The processor 520 and transceiver 512 may also be configured to implement or support any of the procedures and methods described herein, such as the method for classifying incoming traffic with device and/or application tags and determining corresponding policies to be applied to packets. The processor 520 may be implemented as one or more central processor unit (CPU) chips, cores (e.g., a multi-core processor), field-programmable gate arrays (FPGAs), application specific integrated circuits (ASICs), and/or digital signal processors (DSPs). The processor 520 may be implemented using hardware, or a combination of hardware and software.

The memory 522 may function as a policy repository to store policy and tag information. The memory 522 may be used to house the instructions for carrying out the methods described herein, e.g., for storing policies, knowledge of tags, and/or protocols. The memory 522 may comprise secondary storage, random access memory (RAM), and/or read-only memory (ROM) and/or any other type of storage. The secondary storage may comprise one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

It is understood that by programming and/or loading executable instructions onto the network device 500, at least one of the processor 520 and the memory 522 are changed, transforming the network device 500 in part into a particular machine or apparatus, such as an edge router 140 and/or 310 or a policy server 110 and/or 330, having the novel functionality taught by the present disclosure. The executable instructions may be stored on the memory 522 and loaded into the processor 520 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in an edge router, the method comprising:
   receiving an authentication request from an application implemented on a device, wherein the request comprises context information including a device characteristic of the device or of a user of the device and an application characteristic of the application;
   forwarding the authentication request to an authentication and policy server;
   receiving an authentication response from the authentication and policy server, wherein the authentication response comprises an indication of a device tag selected based on the device characteristic and an indication of an application tag selected based on the application characteristic;
   forwarding the authentication response to the device;
   receiving a policy associated with the device tag or the application tag from the authentication and policy server;
   receiving a packet from the device;
   embedding the device tag and the application tag in the packet to form a tagged packet such that the tagged packet comprises the device tag and the application tag, wherein the application tag comprises the context information;
   executing the policy; and
   forwarding the tagged packet according to the policy associated with the device tag and the application tag.

2. The method of claim 1, further comprising:
   receiving a second packet from an adjacent router in a network, wherein the second packet comprises a second device tag; and
   applying a second policy to the second packet according to the second device tag.

3. The method of claim 1, further comprising:
   receiving a second packet from an adjacent router in a network, wherein the second packet comprises a second application tag;
   determining the second application tag by inspecting a field in the second packet; and
   determining access to a second application based on the second application tag.

4. The method of claim 1, wherein the device characteristic comprises at least one of an Internet Protocol (IP) address, a Media Access Control (MAC) address, a port of the edge router that receives the packet, a type of access of the device, a location of the device, and a type of the device.

5. The method of claim 1, further comprising:
   receiving a second packet from an adjacent router in a network, wherein the second packet comprises a second device tag;
   removing the second device tag from the second packet to generate a new packet; and
   forwarding the new packet to a different network.

6. A method implemented in an authentication and policy server configured to couple to a plurality of edge routers in a same domain, the method comprising:
   receiving a request for authentication from an application implemented on a device via an edge router in the plurality of edge routers, wherein the request comprises context information including a device characteristic device or of a user associated with the device and an application characteristic of the application;
   performing an authentication of the request, wherein the authentication comprises determining an identity of the user associated with the device;
   sending a message to the edge router, wherein the message indicates a device tag and an application tag to embed in packets received from the device, wherein the device tag is selected based on the device characteristic, and wherein the application tag is selected based the application characteristic;
   determining a policy to be applied to the packets comprising the device tag or the application tag; and
   communicating the policy to each of the edge routers in response to the determining.

7. The method of claim 6, wherein the authentication and policy server manages a label space from which the device tag was selected.

8. The method of claim 7, wherein the device characteristic comprises at least one of an Internet Protocol (IP) address, a Media Access Control (MAC) address, a port of the edge router that receives the packets, a type of access of the device, a location of the device, and a type of the device.

9. The method of claim 6, wherein the policy is associated with the device tag or the application tag, and wherein the policy indicates a level of access to a network resource.

10. An apparatus comprising:
    a memory;
    at least one transceiver configured to:
       receive an authentication request from, an application implemented on a device, wherein the authentication request comprises context information including a device characteristic of the device or of a user of the device and an application characteristic of the application;

forward the authentication request to an authentication and policy server;

receive an authentication response from the authentication and policy server, wherein the authentication response comprises an indication of a device tag selected based on the device characteristic and an indication of an application tag selected based on the application characteristic;

forward the authentication response to the device;

receive a packet from the device; and receive a policy associated with the device tag or the application tag from the authentication and policy server; and a processor coupled to the memory, wherein the memory contains instructions that when executed by the processor cause the apparatus to:

embed the device tag and the application tag in the packet to form a tagged packet such that the tagged packet coin vises the device tag and the application tag, wherein the application tag comprises the context information; and execute the policy, wherein the at least one transceiver is further configured to forward the tagged packet according to the policy.

11. The apparatus of claim 10, wherein the device tag comprises a first defined constant number of bits in the tagged packet, and wherein the application tag comprises a second defined constant number of bits in the tagged packet.

12. The apparatus of claim 11, wherein the application tag is embedded following a packet inspection to determine a corresponding application.

13. apparatus of claim 10, wherein the at least one transceiver is further configured to receive a second packet from an adjacent router in a network, wherein the second packet comprises a second device tag, and wherein the processor is further configured to apply a second policy to the second packet according to the second device tag.

14. The apparatus of claim 10, wherein the at least one transceiver is further configured to receive a packet from an adjacent router in a network, wherein the packet comprises a second application tag, and wherein the processor is further configured to determine the second application tag by inspecting a field in the packet; and determine access to a second application based on the second application tag.

15. The apparatus of claim 10, wherein the device characteristic comprises at least one of an Internet Protocol (IP) address, a Media Access Control (MAC) address, a port of the apparatus that receives the packet, a type of access of the device, a location of the device, and a type of the device, wherein the device tag may be further based on a destination of the packet.

16. The apparatus of claim 11, wherein the first define constant number of bits and the second defined constant number of bits are equal.

\* \* \* \* \*